Jan. 10, 1928.
A. ANDERSEN
END GATE
Filed Jan. 8, 1926
1,655,489
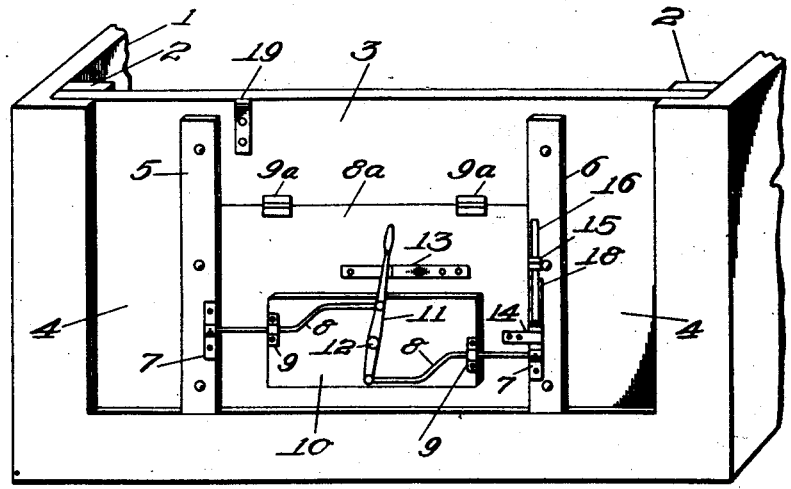
Fig. 1
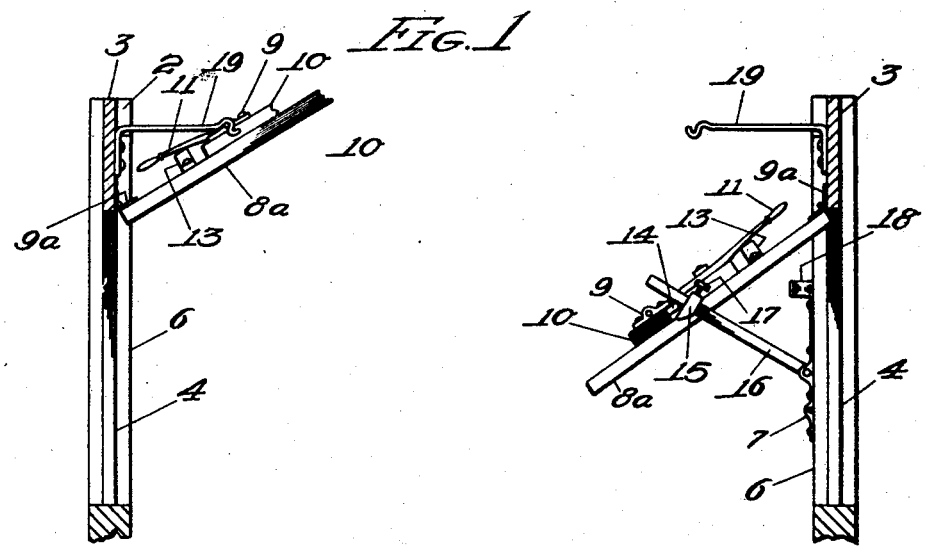
Fig. 3
Fig. 2
WITNESS:
Gust. Hjelm
INVENTOR:
A. Andersen
BY
H. J. Sanders
ATTORNEY.

Patented Jan. 10, 1928.

1,655,489

UNITED STATES PATENT OFFICE.

ANDERS ANDERSEN, OF MORSE BLUFF, NEBRASKA.

END GATE.

Application filed January 8, 1926. Serial No. 80,011.

This invention relates to improvements in end gates for wagons, carts and other vehicles. One object of the present invention is to provide means for adjusting and holding the gate in any adjusted position, wide open, partly open, or closed.

A further object is to provide an end gate of simple construction that is positive and efficient in operation, light in weight, strong, durable and cheap to manufacture and that can be operated readily and with little effort.

With the foregoing and other objects in view the invention consists in the combination and arrangement of parts to be hereinafter fully described, pointed out in the appended claim and illustrated in the accompanying drawing which forms a part of this application and in which—

Fig. 1 is a fragmentary perspective view of a wagon box provided with the improved end gate.

Figs. 2 and 3 are vertical sectional views through Fig. 1 showing the gate in two adjusted positions.

Like reference characters denote corresponding parts throughout the several views.

The reference numeral 1 denotes the vehicle body provided with cleats 2 of the type generally adapted to engage and support the ends of an end gate. The end gate comprises the strip 3 formed with the integral leg portions 4, 4, said strip and leg portions being provided with the standards 5, 6 between which the movable section 8$^a$ of the gate is arranged and connected to the strip 3 by the hinges 9$^a$.

To the standards 5, 6 the oppositely disposed keepers 7, 7 are secured that releasably receive the ends of the sliding bolts 8, 8 that operate through guides 9 arranged upon the block 10 secured upon the gate section 8$^a$, said sliding bolts being operatively connected to the hand lever 11 fulcrumed upon the bolt 12 carried by said block, said lever in one position being adapted for engagement with the keeper 13 whereby it is releasably held in adjusted or operative position. As this lever is manually moved into operative or approximately vertical position the bolts 8, 8 are thrust into the keepers 7, 7, the movable gate section then being in closed position, and the lever is releasably retained in this position by the keeper 13. A lug 14 secured to the gate section 8$^a$ is adapted, in the part open position of the gate, for engagement by a dog 15 slidably arranged upon a bar 16 that is pivotally connected to the standard 6, said dog being capable of locking engagement with the said bar in any adjusted position thereof through the medium of the set screw 17. In Fig. 2 the gate section 8$^a$ is shown supported in part open position by the said lug 14 and dog 15. When the bar 16 is not in use it is retained in upright, out of the way position by means of the keeper 18 arranged upon the standard 6 as shown in Fig. 1.

In wide open position the gate section 8$^a$ may be yieldingly supported by means of the terminally curved or bent spring bracket 19 which will frictionally engage with one bolt 8 as shown in Fig. 3.

What is claimed is:—

The combination with a vehicle body provided with spaced vertical cleats, of a removable strip supported between said members, spaced standards carried by said strip, a hinged movable section within said strip and disposed between said standards, a block arranged upon said hinged section, a hand lever fulcrumed upon said block, keepers arranged upon said standards, a keeper for said lever operative in one position of the same, guides arranged upon said block opposite said keeper, sliding bolts operative in said guides and connected to said hand lever for releasable engagement with said keepers in the closed position of the hinged section, a lug secured to said hinged section and extending laterally therebeyond, a bar pivotally connected to one of said standards, a dog adjustably carried upon said bar for releasable engagement with said lug whereby said hinged section is supported in part open position, and a spring bracket secured to said strip and extending outwardly therefrom above said hinged section for yielding engagement with one of said sliding bolts in the wide open position of said section.

In testimony that I claim the foregoing as my own I have hereto affixed my signature.

ANDERS ANDERSEN.